Figure 1:
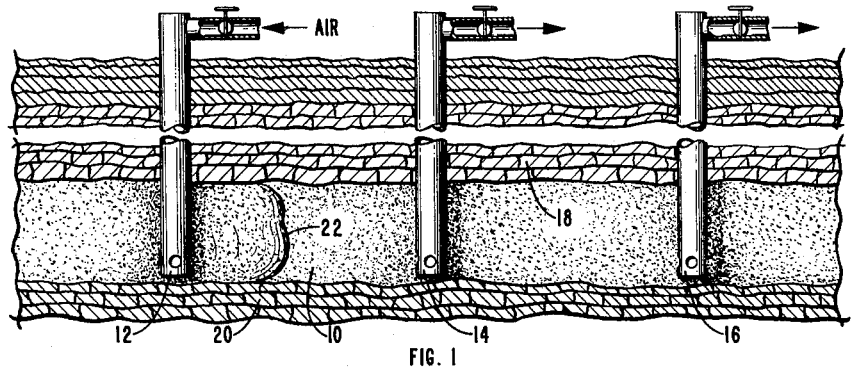

Sept. 29, 1964　　　　　D. N. DIETZ　　　　　3,150,715
OIL RECOVERY BY IN SITU COMBUSTION WITH WATER INJECTION
Filed Sept. 14, 1960　　　　　　　　　　3 Sheets-Sheet 1

INVENTOR
DANIËL N. DIETZ
BY
HIS ATTORNEY

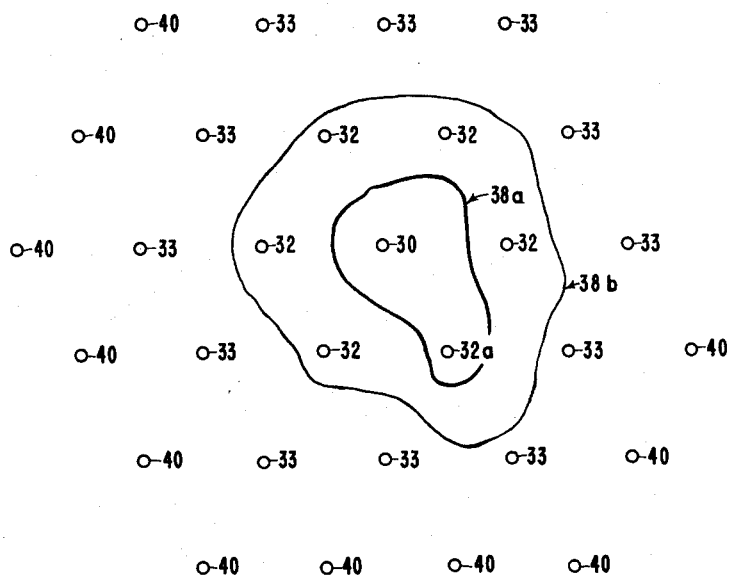

United States Patent Office 3,150,715
Patented Sept. 29, 1964

3,150,715
OIL RECOVERY BY IN SITU COMBUSTION
WITH WATER INJECTION
Daniel N. Dietz, The Hague, Netherlands, assignor to
Shell Oil Company, New York, N.Y., a corporation of
Delaware
Filed Sept. 14, 1960, Ser. No. 55,900
Claims priority, application Netherlands Sept. 30, 1959
6 Claims. (Cl. 166—2)

The present invention relates to a process for recovering oil and gas from oil-bearing underground reservoirs or formations. More particularly, it pertains to a process in which such recovery of hydrocarbons is effected by the use of both in situ combustion in the formation and also of water injection which latter, as will be pointed out below acts as or aids in the driving of said hydrocarbons from an input well towards and into a plurality of output or recovery wells drilled into said oil-bearing formation.

It is well known that energy is required to cause the oil to flow into well bores from remote portions of the oil-bearing formation. It is also well known that the energy content of the virgin oil-bearing reservoir is, as a general rule, insufficient to recover not only all of the oil, but even a substantial fraction thereof. In fact, even if the oil-bearing reservoir originally contained sufficient amount of hydrocarbon gas under pressure to provide the theoretical energy necessary for the substantially complete or even complete removal of oil, a very large portion of this energy is wasted because the gas escapes from the producing wells without bringing oil to the well bore in amounts corresponding to the available energy. Therefore, primary production results in the recovery of only a small fraction of the oil originally present in the oil-bearing reservoir or formation. In order to increase this oil recovery, resort had been made in the past to water and/or gas injections, this to supplement the natural energy of a reservoir, or, in secondary recovery methods, to supply energy to reservoirs which have lost most or all of their energy. However, it is known that these methods, whether applied simultaneously or successively, fail to recover anything close to all of the oil present in the reservoir or formation thus treated.

In order to effect a more efficient oil recovery, it has also been previously proposed to initiate and maintain in the formation in situ combustion in which a part of the oil in the formation is burned to generate the necessary heat and energy, which heat is caused to be moved from the zone of an injection well to other points in the formation. Although improvement in oil recovery efficiency results, considerable amounts of oil are still lost, either due to uncontrolled combustion, or due to channelling, or both.

Recently an improved process has been developed in which water injection is combined with in situ combustion. According to this process, a combustion front is first formed in the formation immediately surrounding an injection well, said combustion front being then caused to move away from the injection well and towards one or more production wells, water being injected (preferably together with the air, or another oxygen-containing gas) through the injection well and into the formation when the combustion front has travelled an adequate distance through the formation. In the hot zone behind the combustion front, the water becomes vaporized, the steam thus formed passing through the combustion front and finally condensing again downstream, i.e., ahead, of the combustion front. This condensed hot water then acts as a water-drive or piston to force at least a portion of the oil ahead of the combustion zone towards the production well or wells.

At a given moment the injection of air or of another oxygen-containing gas is discontinued, this moment being so selected that steam will still penetrate to the production well or wells, from which oil may be thus recovered.

The process just described is usually to be employed in situations wherein the well pattern consists or comprises a series of alternating injection and production wells. Under these conditions the combustion front or rather fronts move away from the injection wells and move toward the production wells from all sides.

One of the main objects of the present invention is to provide an improved process for production of oil formations by the combined use of in situ combustion and water injection, which process is more efficient than the hitherto known processes involving water injection and in situ combustion. Another object is to provide such an improved process for the production of oil and/or gas from partially depleted oil-bearing formations, which improved process (involving the combined use of in situ combustion and water injection) can be effectively adjusted to the particular characteristics of the formation treated to produce the hydrocarbons more efficiently and in larger amounts.

It has now been discovered that the above and other objects may be attained by using and effecting in an oil-bearing formation a combined steam drive and in situ combustion process in which, after the aforesaid condensation front has reached a production well (from which oil was being produced), but before the combustion front has reached said production well, a new combustion front is caused to be formed in said formation at said production well by injection of air or of another oxygen-containing or oxidizing gas into said formation through said production well, said new combustion front moving behind the condensation front towards one or more other production wells extending into the formation from which oil recovery is being effected.

The invention may, therefore, be stated to reside in a process for the recovery of oil from an oil-bearing underground formation in which a heat wave or combustion front is caused to move or advance from an input well for injection of air or another oxidizing gas toward a plurality of output or production wells, this process including the steps of: (a) heating the formation around the bore of the above-mentioned injection well, (b) propagating this heated zone as a heat wave (or combustion front) within the formation by injection of an oxygen-containing propagating gas through the injection well and towards an adjacent production well, (c) injecting water through said input well and into the formation whereby the water is vaporized and is propagated towards said adjacent output well, (d) continuing these water and oxygen-containing gas injections through the said input well whereby the steam formed moves toward the output wells and passes through the combustion front and is condensed at a condensation front ahead or downstream of said combustion front, (e) continuing these injections of gas and water until the condensation front has reached the first of the production wells, but before the combustion zone has reached said well, (f) establishing a new combustion zone in the formation immediately around said last-mentioned production zone, and (g) propagating said new combustion zone behind the condensation front towards other production wells but continued injections of water and oxygen-containing gas through the first-mentioned ("adjacent") production well.

It has been found preferable to initially heat the formation around the injection well to a temperature at or above 250° C. When the condensation front has reached a given output or production well, it is preferably shut in, injection of air into said well (and therefore its use as another input well) being initiated after the condensation front has passed it. Also, it is recommended to also inject water into said new input well (which until now had been a production well), this in addition to air injection, once a hot, burnt-out zone had been formed behind the new combustion front.

It is also desirable to continue the injection of water and air into an injection well until the condensation front has passed all the production wells situated near said injection well, and to continue water injection into said injection well as long as the hot zone formed by the original combustion front exists. In this connection it may be noted that after the condensation front has passed a given production well and when injection of water and air into said well has been initiated, this well should henceforth be regarded as an input or injection well.

In the present specification and the appended claims the term "air" is used to denote not only air, but also oxygen, an oxygen-containing gas, as well as an oxygen-yielding gas.

The present invention will be better understood from the following detailed description thereof, particularly when considered with reference to the accompanying drawings which form a part of this specification. In these drawings:

FIGURES 1–6 represent a diagrammatic view of the process of the invention in operation in an underground formation, said figures illustrating the conditions existing in certain successive stages of the process of the invention; and FIGURES 7 and 8 each show a plan view of a part of an oil-bearing formation in which the method of the present invention is or can be employed.

Referring first to FIGURES 1–6, each of these drawings shows an oil-producing stratum 10 as being penetrated by three wells 12, 14 and 16 spaced some distance apart. The oil-bearing formation 10 is covered by an impermeable overburden 18 and rests on an impermeable layer 20.

Figure 2:
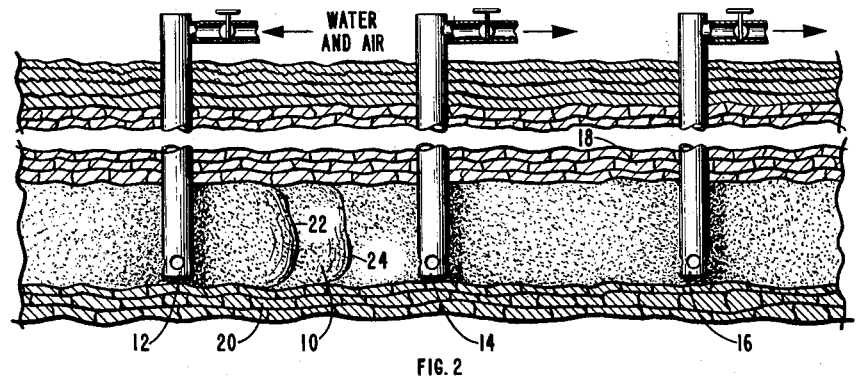

FIGURE 1 shows a heated zone or combustion front 22 which has been formed by any known techniques and which has reached a position intermediate between wells 12 and 14 but closer to well 12. In this case air is shown as being injected into the well 12, this air maintaining the combustion front 22 and causing it to advance toward well 14. The combustion gases escape through well 14, and, if desired, through well 16, these wells also producing oil. The combustion front drives oil ahead of it towards wells 14 and 16, leaving a hot zone behind. By injecting water into well 12, this water reaches the hot zone wherein the water is converted into steam which will move likewise in the direction of wells 14 and 16. The steam, as is shown in FIGURE 2, will flow through the combustion zone 22 until the steam reaches a cooler zone which is ahead or downstream of said combustion front; here, the steam condenses to form a condensation front 24. A large portion of the oil in formation 10 is driven ahead of the condensation front towards wells 14 and 16.

The amount of water injected should be such that the hot zone behind the combustion front (i.e., in the area through which the combustion front has passed) has as constant a length as possible, measured in the direction of flow; if an excessive quantity of water is supplied, the combustion front would eventually be extinguished, whereas if too little water is supplied the optimum result is not obtained. Depending on the characteristics of the formation it may be suitable to generate up to about 1 pound of steam per pound of air used for the combustion. Not all the water injected is converted into steam, however, one of the reasons being the increasing amount of water accumulating in the formation upstream of the moving hot zone. This should be taken into account when the ratio of injected air and injected water is determined.

In this connection it must be noted that one of the advantages of the process of the present invention resides in the finding that the use of steam in connection with air causes spontaneous ignition of the crude oil. Thus, when using mixtures of steam and air containing as low as 20% by weight of air, spontaneous ignition of the crude occurred. The steam raises the formation temperature near the injection well so that spontaneous ignition of the formation crude oil can be achieved comparatively quickly and reliably. This technique would find a special application in oil formations containing heavy oils with poor oxidation properties, e.g., at Athabasca, Canada. The advantage of this process besides those described above would reside in the fact that it is quite economical both with respect to the chemical requirements and the well completion requirements. When the process of the present invention is to be used, the wells may be completed with a relatively slim liner into which a single insulated steam line is extended. In such case the steam and air mixture may be introduced by flowing air down the annulus and the water down the steam line.

Figure 3:
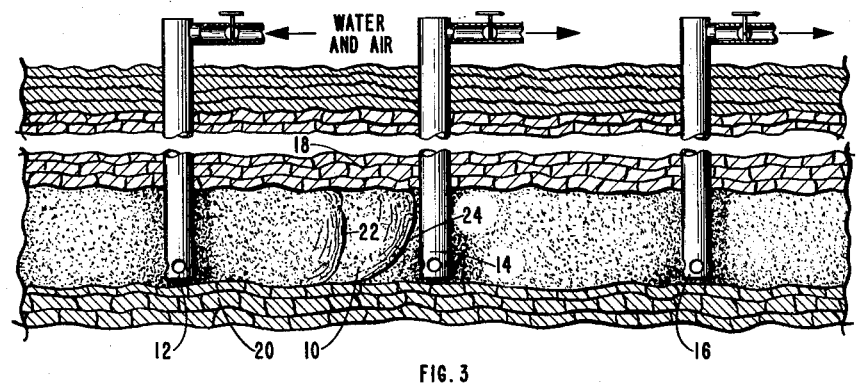
Figure 4:
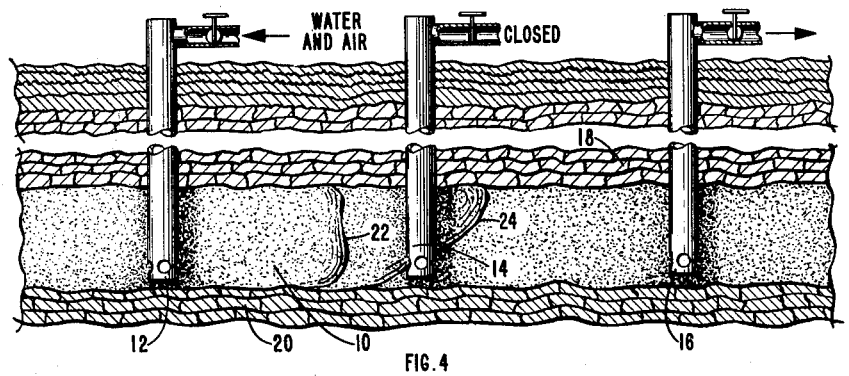
Figure 5:
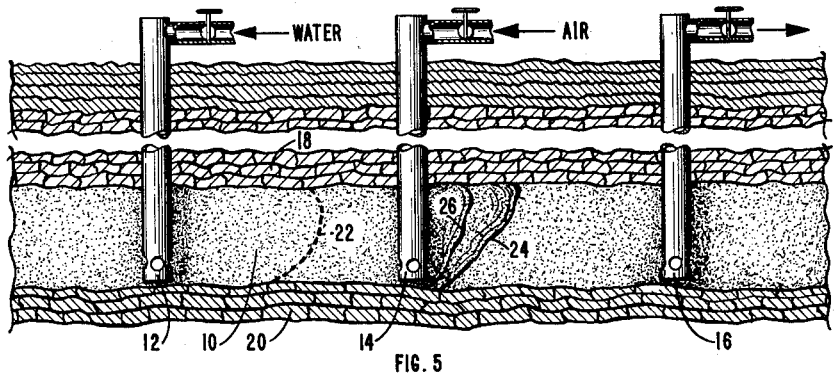

By selecting proper quantities of air and water, the condensation front 24 will travel much faster than the combustion front 22. For instance, the rate of travel of the condensation front may be twice that of the travel of the combustion front. Thus, FIGURE 3 shows a stage when the condensation front 24 has advanced much farther than the combustion front 22, this as compared with the positions of these two fronts in the stage shown in FIGURE 2. According to FIGURE 3 part of the condensation front 24 has just reached well 14. The oil which has been driven ahead of the condensation front, and thus has approached well 14, is thus being produced from well 14. As the condensation front 24 progresses further, increasing amounts of steam penetrate into well 14, the production of oil decreasing until the yield of oil from this well is no longer efficient. At this time and as shown in FIGURE 4, well 14 is closed, and well 16 (if it had not already been opened previously) is now opened. The condensation front 24 can thus advance further under the influence of the water injection through well 12. When the condensation front 24 has completely or substantially completely passed well 14, the injection of air into well 14 is initiated. As shown in FIGURE 5, this air comes into the hot steam zone behind the condensation front 24 and oxidizes or burns the oil which has remained behind. The thus created heat raises the temperature so that a new combustion front 26 is formed between well 14 and the condensation front 24. By terminating the injection of air into well 12, combustion front 22 is extinguished. This disappearing combustion front 22 is indicated in FIGURE 5 by a dotted line 22.

Figure 6:
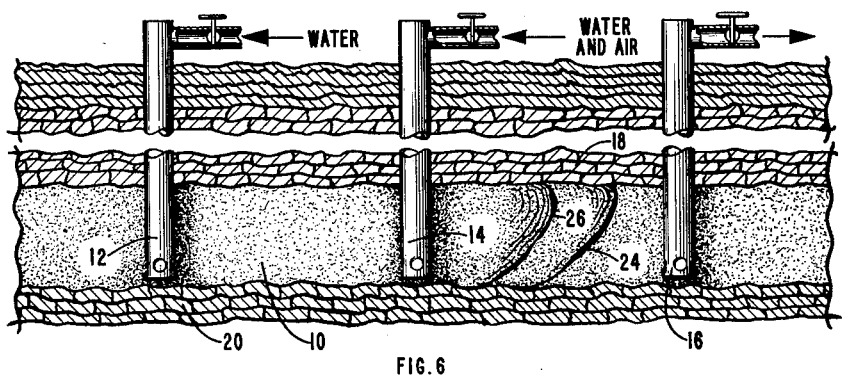

Under the influence of additional air injection into the formation through line 14 as well as under the influence of water injection into this well and also, if desired, into well 12, combustion front 26 and condensation front 24 advance towards well 16, as this is shown in FIGURE 6. The conditions existing in the oil formation 10 in the space between wells 14 and 16 will then correspond substantially to those between wells 12 and 14 (see FIGURE 2).

It will be clear that oil can be produced from well 16 until the condensation front 24 has reached this well and until the amount of steam entering into said well from the formation becomes so great that oil production is no longer efficient. At this time well 16 should likewise be closed until the condensation front 24 has passed it, after which air may be injected into this well 16 so that a still newer combustion front may be formed once more and the oil driven to still another producing well not shown in FIGURES 1–6.

It is thus seen that the invention enables a condensation front to sweep through a formation without interruption, the heat required for this being supplied by a combustion front which varies from well to well.

Compared with the method in which no water is injected, the process of the present invention has the further advantage that the total amount of air to be injected is lower, and that fewer or smaller air compressors may be required for the same rate of production and the condensation front will advance much faster than a combustion front when the same quantity of air is supplied. In addition, the production wells are not subjected to excessively high temperatures, so that heat resistant materials need not be used in completing said wells, and repairs and consequent interruptions of production are thereby decreased.

As mentioned, FIGURES 7 and 8 are disclosed plan views of a part of an oil-bearing formation in which the method of the invention may be used, the two figures showing by way of illustration different well patterns to which the method of the invention may be applied.

Referring first to FIGURE 7, injection well 30 is in the center, and is surrounded by rings of production wells 32 (including 32a), 33 and 40. When a combustion front (not shown in FIGURE 7) and a condensation front have been formed around well 30, these fronts will advance in the formation in all directions, the condensation front reaching eventually one or more of the production wells 32. In view of the inhomogeneity of the formation traversed, it is highly unlikely that the condensation front will reach all of the production wells 32 at the same time. The well which is reached first is designated in FIGURE 7 as 32a, the position of the condensation front being designated in said figure by the line 38a. After oil has been produced from well 32a and when excessive quantities of steam begin to come up therethrough, this well 32a should be closed in so that the condensation front may pass beyond it. At such time air should be injected into the well, the injection of air and water into and through well 30 being meanwhile continued to insure that the condensation front also penetrates to the other wells 32 and advances beyond said wells towards wells 33. Thereupon, the condensation front will, for example, assume the shape designated by line 38b. Thereupon air injection into and through well 30 may be discontinued, after which the original combustion front will be extinguished for lack of oxygen. At the same time a new combustion front fed by air injected into and through wells 32 will gradually be formed, first as individual fronts and then finally in the form of a more or less continuous combustion front behind the condensation front 38b. Water injection into the wells 32, and, if desired, into well 30, will cause the condensation front to be driven further towards wells 33 and finally wells 40.

The continued water injection into well 30 has the advantage that the heat of the original combustion front and of the hot zone upstream thereof is effectively utilized.

Irregularities in the formation, for example, a number of small fractures, may of course prevent or considerably hamper the advance of the combustion front and of the condensation front in a part of the formation. In such a case special measures are required, such as the formation of a new combustion front and a new condensation front behind the dislocation.

Furthermore, it may be noted that the air injection and the water injection need not be effected continuously. Practically the same effect will be obtained in the formation if air and water are injected alternately, thus reducing the risk of corrosion in the injection well. This risk may also be obviated by injecting water and air into the well separately, for example, by introducing the air through the tubing and the water through the annular space between the tubing and the casing. The use of a packer will insure that water and air will not come into contact until after they have reached the formation.

Referring again to FIGURE 7, if when the condensation front has assumed the shape designated in said figure by line 38b, well 30 is closed and air and water are injected into wells 32 (including well 32a), the condensation front will move towards the group of wells designated by numeral 33; when these wells have also been passed, the condensation front can then be moved towards wells 40 at the edge of the field by injection of water and air into and through the wells 33.

As indicated above with reference to FIGURE 7, the process of the invention may be effected by starting with one injection well which is centrally located in the formation to be treated, the condensation front advancing in all directions. On the other hand, according to another facet of the process and with particular reference to FIGURE 8, a condensation front is formed over the entire width of the part of the formation to be treated. This front advancing over its entire width has a "line drive." In this case there are a number of injection wells 81 in a straight line, and to the right of them there are successive rows of production wells 82, 83, 91, 92, etc., the condensation front (not indicated in this figure) moving to the right first to wells 82, then to wells 83, and gradually further to the right to wells 91, 92 and beyond.

With the present method it is possible to adjust the water/air ratio locally in each case when an ex-production well is available for injection. In addition, if the condensation front deviates from the vertical, the present method does not necessitate the production of large amounts of steam along with the oil, but a well can be closed in after a break-through of steam, in the expectation that the oil thus temporarily lost will be recovered more efficiently in a downstream well. Moreover, with the new method a combustion front need be ignited in the formation at original temperature for a smaller number of wells only.

If, in addition, it is desired to minimize the amount of oil remaining behind in the formation by reducing the distance from well to well, the known process will necessitate a shorter distance from well to well over the entire formation area, whereas with the method of the invention it is only near the border of the field that the wells need be placed closer to each other.

I claim as my invention:

1. In the recovery of oil from an oil-bearing underground formation wherein a heat wave is established within the formation, and wherein said heat wave is caused to advance from an input well toward a plurality of output wells, the steps comprising initiating a heat wave in said formation around said input well, propagating said heat wave within the formation by injection of an oxygen-containing propagating gas through the input well and towards an adjacent output well, injecting water into the underground formation through said input well whereby said water is vaporized and is propagated towards said adjacent output well, continuing the injections of said oxygen-containing gas and of said water through said input well whereby the steam formed passes through the heat wave and is condensed at a condensation front ahead of said heat wave, maintaining said injections of said propagating gas and water until the condensation front has reached said adjacent output well but before the heat wave has reached said last-mentioned well, terminating said injection of the propagating gas into said first-mentioned input well when the condensation front has reached said adjacent output well, establishing a new heat wave in the underground formation at and around said mentioned output well, and propagating said new heat wave behind the condensation front towards further output wells by further injection of water and oxygen-containing propagating gas through the first-mentioned output well.

2. In the recovery of oil from and oil-bearing underground formation wherein a heat wave is established within the formation, and wherein said heat wave is caused to advance from an input well toward a plurality of output wells, the steps comprising heating the formation around the bore of an input well to establish a heated zone in the formation around said input well at above about 250° C., propagating the heated zone as a heat wave within the formation by injection of an oxygen-containing propagating gas through the input well and towards an adjacent output well, injecting water into the underground formation through said input well whereby said water is vaporized and is propagated towards said adjacent output well, continuing the injections of said oxygen-containing gas and of the water through said input well whereby the steam formed passes through the heat wave and is condensed at a condensation front ahead of said heat wave, maintaining said injections of said gas and water until the condensation front has reached said adjacent output well but before the heat wave has reached said last-mentioned well, terminating said gas injection, while continuing water injection through the input well, when said condensation front has reached said adjacent output well but before the heat wave has reached said last-mentioned well thereby transferring said condensation front to the other side of said last-mentioned well, establishing a new heat wave in the underground formation at and around said mentioned output well, and propagating said new heat wave behind the condensation front towards further output wells by further injections of water and oxygen-containing propagating gas through the first-mentioned output well.

3. In the recovery of oil from an oil-bearing underground formation wherein a combustion front is established within the formation, and wherein said combustion front is caused to advance from an input well toward a plurality of output wells, the steps comprising initiating a combustion front in the formation around the bore of an input well in the formation around said input well, causing said combustion front to move as a combustion zone into the formation and toward an adjacent output well by injection of an oxygen-containing propagating gas through the input well, injecting water into the underground formation through said input well whereby said water is vaporized and is propagated towards said adjacent output well, continuing said injections of said oxygen-containing propagating gas and of the water through said input well under conditions such that the steam formed passes through the combustion zone and is condensed at a condensation front ahead of said combustion zone, continuing said gas and water injections until the condensation front has reached said adjacent output well but before the combustion zone has reached said last-mentioned well, terminating said gas injection, while continuing said water injection through said first input well, when said condensation front has reached said adjacent output well but before the combustion zone has reached said last-mentioned well, thereby transferring said condensation front to the other side of said output well, injecting oxygen-containing gas through said last-mentioned output well thereby establishing a new combustion zone in the underground formation at and around said mentioned output well and propagating said new combustion zone behind the condensation front towards further output wells by further injection of water and oxygen-containing propagating gas through the first-mentioned output well.

4. The process according to claim 3 wherein air is used as the oxygen-containing propagating gas.

5. In the recovery of oil from an oil-bearing underground formation wherein a combustion front is established within the formation, and wherein said combustion front is caused to advance from an input well towards a plurality of output wells, the steps comprising heating the formation around the bore of an input well to establish a heated zone in the formation around said input well at about about 250° C., injecting an oxygen-containing propagating gas into said formation through the input well and towards an adjacent output well thereby initiating in said formation a combustion zone which is caused to move outward from the vicinity of the input well toward the output wells, injecting water into the underground formation through said input well whereby said water is vaporized and is propagated towards said adjacent output well, continuing said injection of the propagating gas and of water through said input well under conditions whereby the steam formed passes through the combustion zone and is condensed at a condensation front ahead of said combustion zone, further continuing said propagating gas and water injections until the condensation front has reached said adjacent output well but before the combustion zone has reached said last-mentioned well, terminating said gas injection while continuing water injection through the input well when said condensation front has reached said adjacent output well but before the combustion zone has reached said last-mentioned well, thereby transferring said condensation front to the other side of said last-mentioned well, establishing a new combustion zone in the underground formation at and around said mentioned output well and propagating said new combustion zone behind the condensation front towards further output wells by further injection of water and oxygen-containing propagating gas through the first-mentioned output well.

6. In a method for producing oil from an underground formation in which method an oxidizing gas and water are introduced into the formation through an injection well and are caused to propagate toward several production wells, and wherein said oxidizing gas is caused to form a moving combustion front while the water in the form of steam moves through said formation toward the production wells and forms a likewise moving condensation front ahead of said combustion front, the improvement which comprises continuing said water and oxidizing gas introduction steps until the condensation front has reached one of said production wells, terminating the injection of the oxidizing gas through the first-mentioned injection well, forming a new combustion front in the formation in the vicinity of said first-reached production well by injection of the oxidizing gas through said first-reached production well, and causing said new combustion front to move behind the condensation front towards the other of said production wells.

References Cited in the file of this patent

UNITED STATES PATENTS

| 2,788,071 | Pelzer | Apr. 9, 1957 |
| 2,798,556 | Binder et al. | July 9, 1957 |
| 2,803,305 | Behning et al. | Aug. 20, 1957 |
| 2,839,141 | Walter | June 17, 1958 |

OTHER REFERENCES

Uren, L. C.: "Petroleum Production Engineering (Exploitation)," 2d Ed., McGraw-Hill, 1939, pp. 452–459.

McNiel, J. S., Jr. and Moss, J. T.: "Oil Recovery by In-Situ Combustion," The Petroleum Engineer, July 1958, page B29.